Oct. 28, 1958    A. J. GALE    2,858,441
METHOD OF INCREASING THE UNIFORMITY OF DOSE PRODUCED
BY A BEAM OF HIGH ENERGY ELECTRONS THROUGHOUT THE
VOLUME OF OBJECTS IRRADIATED THEREBY
Filed Dec. 1, 1953    4 Sheets-Sheet 1

INVENTOR: *Alfred John Gale*
BY: *Henry C. Nields* ATTY.

Oct. 28, 1958  A. J. GALE  2,858,441
METHOD OF INCREASING THE UNIFORMITY OF DOSE PRODUCED
BY A BEAM OF HIGH ENERGY ELECTRONS THROUGHOUT THE
VOLUME OF OBJECTS IRRADIATED THEREBY
Filed Dec. 1, 1953  4 Sheets-Sheet 2

INVENTOR: Alfred John Gale
BY: Henry C. Nields
ATTY.

Oct. 28, 1958 A. J. GALE 2,858,441
METHOD OF INCREASING THE UNIFORMITY OF DOSE PRODUCED
BY A BEAM OF HIGH ENERGY ELECTRONS THROUGHOUT THE
VOLUME OF OBJECTS IRRADIATED THEREBY
Filed Dec. 1, 1953 4 Sheets-Sheet 3

INVENTOR: Alfred John Gale
BY: Henry C. Nields
ATTY.

United States Patent Office 2,858,441
Patented Oct. 28, 1958

2,858,441

METHOD OF INCREASING THE UNIFORMITY OF DOSE PRODUCED BY A BEAM OF HIGH ENERGY ELECTRONS THROUGHOUT THE VOLUME OF OBJECTS IRRADIATED THEREBY

Alfred J. Gale, Lexington, Mass., assignor to High Voltage Engineering Corporation, Cambridge, Mass., a corporation of Massachusetts Application December 1, 1953, Serial No. 395,539

8 Claims. (Cl. 250—49.5)

This invention relates to the irradiation of materials or substances with high energy electrons, and in particular to a method of controlling the distribution of the ionizing energy of an electron beam throughout the volume of a product irradiated thereby.

Briefly stated, my invention comprehends irradiating a product with an adequately defined beam of high energy electrons and simultaneously imparting to such product a rotational velocity about an axis transverse to the direction of travel of the electrons in such beam. Preferably such product is rotated about an axis substantially perpendicular to the direction of travel of the electrons in said beam; but my invention is not limited thereto, and by the term "transverse" I mean to include any substantial angle between said axis of rotation and said direction of electron travel.

Figure 1:
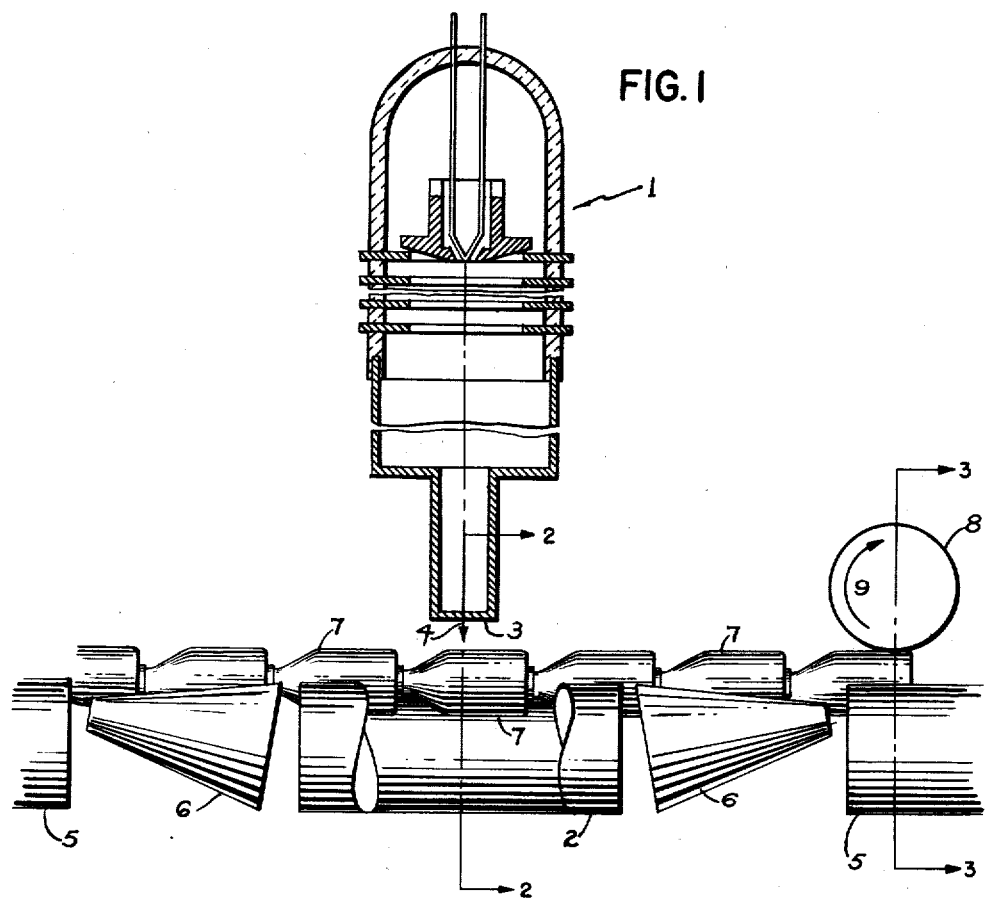
Fig. 1 is a side elevation showing one embodiment of apparatus for practising my invention.

It is now becoming established that all types of living organisms are affected by high energy electrons and that lethal effects can be produced on unwanted organisms by doses which will raise the temperature of water only a few degrees centigrade. The growing availability of streams of high energy electrons makes possible the practical application of this knowledge to the sterilization of many important products, such as pharmaceuticals, surgical instruments, animal tissue for transplant purposes, as well as for the preservation of certain foods.

Moreover, the possibility of using high energy electrons to promote chemical reactions has recently been explored, including endothermic chemical reactions which require energy in concentrated form and exothermic chemical reactions which are triggered or catalyzed by the initial application of concentrated energy.

Measurements of the properties of high energy electrons have disclosed that their range in typical materials is limited. For example, a 2-million-volt electron beam has a maximum range in water of 1 cm. The maximum range is nearly proportional to the energy of the bombarding electrons and nearly inversely proportional to the density of the bombarded material.

For one-sided irradiation the maximum useful range is approximately two-thirds the maximum range. Thus, in order to irradiate a product 1 cm. thick and having a density equal to that of water, a 3-million-volt electron beam is required. By imparting a rotational velocity to the product in accordance with my invention, the effective range of an available electron beam is more than double that obtainable by one-sided irradiation, and exceeds even that obtainable by double-bombardment techniques. For example, a product whose thickness would require 5-m. e. v. electrons using one-sided irradiation may be irradiated with 1.7-m. e. v. electrons by rotating the product in accordance with my invention. Using double bombardment techniques, whereby a product is irradiated either simultaneously or successively from opposing sides, 2.1-m. e. v. electrons would be required.

The biological and chemical effects produced in a product irradiated by high energy electrons are closely related to the amount of ionizing energy absorbed in such product by such electrons. Accordingly, the dose received at any point in such product is measured in terms of the amount of ionizing energy absorbed per unit mass at that point, and the unit of dose is generally the "roentgen equivalent physical," which is abbreviated "rep" and which is herein defined as that amount of ionizing energy which will result in the absorption of 83 ergs per gram of air.

If the term "ionizing effect" be defined as the dose received per unit time, then the increment of dose $dD$ received in the increment time $dt$ will be equal to the ionizing effect during that time interval multiplied by $dt$.

Frequently it is desirable to control the distribution of dose throughout the volume of the product irradiated by high energy electrons. For example, non-uniformity of dose reduces efficiency and may enhance undesirable side effects. In general, it will be necessary that all portions of the material irradiated receive at least a minimum dose. However, it will generally not be necessary that any portion of such material receive more than such minimum dose; and furthermore, doses in excess of such minimum may enhance undesired side effects. Consequently, to the extent that excessive doses are received at some portions of the material irradiated, efficiency is lowered and undesirable side effects are increased.

Lateral uniformity of dose distribution (that is, uniformity in any plane perpendicular to the direction of travel of the electrons in the beam) has been achieved by various techniques, some of which are disclosed and claimed in a co-pending application of Burrill, Ser. No. 203,172, filed December 28, 1950, now U. S. Patent No. 2,680,815, and assigned to the assignee of the present invention. However, uniformity of dose distribution in depth (that is, uniformity in the direction parallel to the direction of travel of the electrons in the beam) has been difficult to achieve, owing to the distribution of the ionizing effect in depth.

The ionizing effect produced in the material irradiated by high energy electrons is not uniform in depth. The maximum ionizing effect occurs at about one-third the maximum range. The ionizing effect at the surface of the material irradiated is about 60% of the maximum ionizing effect. The relative ionizing effect rises with depth at a decreasing rate from 60% at the surface to 100% at one-third the maximum range; then falls with depth at an increasing rate to 60% at two-thirds the maximum range; and then falls with depth at a substantially constant rate to zero at the maximum range. (See Fig. 8, discussed in detail hereinafter.)

By rotating the product in accordance with my invention, the dose distribution in depth may be controlled to a large extent by proper selection of electron energy, beam diameter, and the relative positions of the beam-axis and the axis of rotation of the product.

Figure 2:
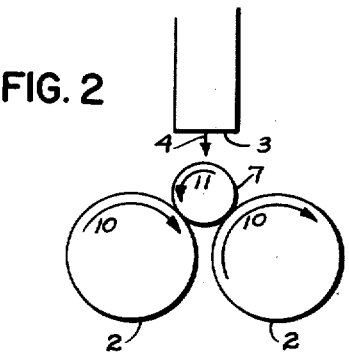
Fig. 2 is a vertical cross section along the line 2—2 of Fig. 1.
Figure 3:
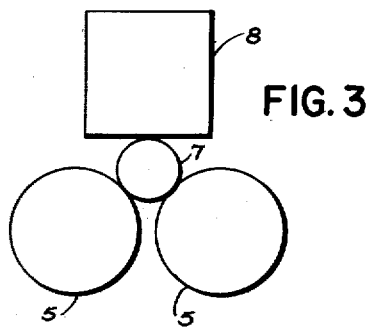
Fig. 3 is a vertical cross section along the line 3—3 of Fig. 1.

Referring to the drawings, and first to Figs. 1, 2 and 3 thereof, therein is shown one embodiment of apparatus for practising the method of my invention. An evacuated tube for the acceleration of electrons to high energy is indicated at 1. My invention is not limited to any particular source of high energy electrons, but I find it convenient to use an acceleration tube of the type disclosed in U. S. Patent No. 2,517,260 to Van de Graaff and Buechner, since such an acceleration tube is capable of producing a continuous beam of substantially monoenergetic electrons.

A pair of rotatable guides 2 is positioned a short distance below the electron window 3 through which a beam 4 of high energy electrons issues from the acceleration tube 1. Suitably spaced from each end of said pair of rotatable guides 2 a pair of stationary guides 5 is positioned in alignment therewith. Between said pair of rotatable guides 2 and each of said pairs of stationary guides 5 is positioned a pair of rotatable conical guides 6, the large-diameter end of each conical guide 6 being adjacent to one of said rotatable guides 2. Said conical guides 6 are aligned with the rotatable guides 2 and the stationary guides 5 in such a manner as to provide a continuous conveyor system which supports a production line of articles to be irradiated.

Since the distribution in depth of the ionizing effect produced by a high energy electron beam is essentially the same for all materials, except that the maximum range varies inversely with the density of the material, the method of my invention is not limited to any particular material. My invention is especially useful in the sterilization or preservation of foods, drugs, and the like, where side effects produced by excessive dosage are particularly undesirable. For purposes of illustration there is shown at 7 in said Figs. 1, 2 and 3 a series of vials which may be filled, for example, with a drug which is to be sterilized; but my invention is not limited to such a product.

A roller 8, positioned above one of the pairs of stationary guides 5 and in contact with the series of vials 7, rotates in the direction of the arrow 9, thereby moving the line of vials 7 through the path of the electron beam 4. Rotatable guides 2 are rotated in the direction of the arrows 10, so that a rotational velocity in the opposite sense, as indicated by the arrow 11, is imparted to each vial 7 as it passes under the electron beam 4. Conical guides 6 are rotated in the same direction and with the same rotational velocity as the rotatable guides 2, so that each vial 7 gradually acquires maximum rotational velocity. If the vials contain liquid material, this maximum rotational velocity should be sufficiently great to prevent turbulence in the liquid as it passes under the electron beam. Rotating guides 2, conical guides 6, and roller 8 may be driven by any convenient means, not shown.

Figure 4:
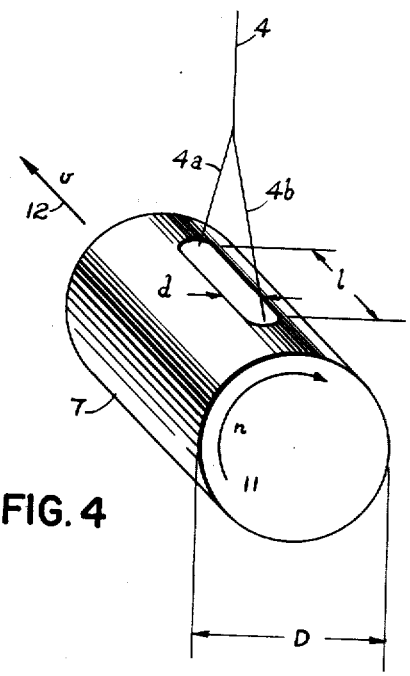
Fig. 4 is a diagram of a cylindrical product being irradiated with a beam of high energy electrons in accordance with my invention and illustrates certain critical dimensions of said product and said beam.

In order to illustrate the principle of my invention, the irradiation of a cylindrical product with a beam of substantially monoenergetic electrons will now be analyzed. Referring now to Fig. 4 a cylindrical product 7 of diameter D is irradiated by an electron beam 4 of diameter $d$. A constant rotational velocity of $n$ revolutions per second is imparted to the product 7 about its longitudinal axis, as indicated by the arrow 11, and a constant translational velocity of $v$ cm./sec. is imparted to the product 7 in a direction parallel to its longitudinal axis, as indicated by the arrow 12. The longitudinal axis of the product 7 is perpendicular to the beam axis.

It may be desirable to impart a rapid oscillatory movement to the beam 4, so that the beam 4 is fanned out in a plane parallel to the longitudinal axis of the product 7, as indicated by the lines 4a, 4b. The purpose of this is to insure that every point in the product 7 completes either an integral number of revolutions or else a large number of revolutions while under the electron beam 4. Since every point in the product 7 will move a distance $v/n$ cm. in the direction of the arrow 12 during each revolution, the length $l$ of the fanned beam 4a, 4b should be either a multiple of $v/n$ or else very much greater than $v/n$. Various means for fanning out an electron beam in this manner are fully disclosed in the co-pending application of Burrill, hereinbefore referred to. As is disclosed in said application, such fanning out of the electron beam will render more uniform the dose distribution in the lateral direction—i. e., parallel to the longitudinal axis of the product 7 in Fig. 4.

Such fanning out of the electron beam may be accomplished either by imparting an oscillatory movement to the electron beam or by focusing the electron beam in a cylindrical electron-optical system. The latter technique has the advantage that the distribution of beam current over the length $l$ (Fig. 4) assumes a Gaussian form, with the result that the length $l$ need only be greater than 4 $v/n$ to give a uniformity of dose distribution in the lateral direction of more than 90%.

It is clear from considerations of symmetry that the dose distribution in the product will be uniform in the angular direction; i. e., all points equidistant from the center of rotation will get the same dose.

I have discovered, however, that rotation of a product while being irradiated by a beam of substantially monoenergetic electrons increases uniformity in depth; i. e., throughout the cross section of the product.

Figure 5:
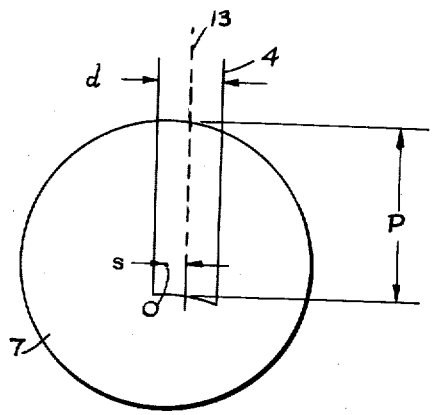
Fig. 5 is a diagram in cross section of the cylindrical product of Fig. 4 and illustrates certain critical relationships between the product and the beam of high energy electrons.

Referring now to Fig. 5, therein is shown a cross section of the product 7 of Fig. 4 while under the beam 4. Since all points equidistant from the center O receive the same dose, uniformity of dose depends solely on the variation of dose as a function of distance from the center O. Said variation, in turn, depends only on three variables; the penetration P, the beam-diameter $d$, and the displacement $s$.

The penetration P is the maximum depth in the product at which appreciable ionizing energy is absorbed. It is nearly proportional to the energy of the bombarding electrons and nearly inversely proportional to the density of the product. For a given product, P is controlled by adjustment of the accelerating voltage by which the electrons are accelerated.

The beam-diameter $d$ is controlled by conventional focusing and beam-defining devices, well known in the art.

The displacement $s$ is the distance between the beam axis 13 and the axis of rotation O of the product, and is controlled by appropriate positioning of the product in the path of the beam.

In general, it will be desired to irradiate the entire cross-sectional area of the product uniformly, including the center O. This immediately imposes certain restrictions on the three variables. First, P cannot be less than the radius of the product. Second, $s$ cannot exceed $d/2$.

Moreover, the effect of rotation on dose distribution is less pronounced the greater the value of $d$. Hence $d$ should, in general, be substantially less than the diameter D of the product. Although the effect of rotation on dose distribution increases with decreasing $d$, for very small beam diameters this rotational effect becomes concentrated at the center of rotation, resulting in excessive dose at the center of rotation with little rotational effect elsewhere in the product.

Since the requisite accelerating voltage is proportional to P, a large value of P is undesirable. Moreover, if P is much larger than the radius of the product, excessive dose at the center of the product will result. Hence P should only slightly exceed the radius of the product.

Figure 6:
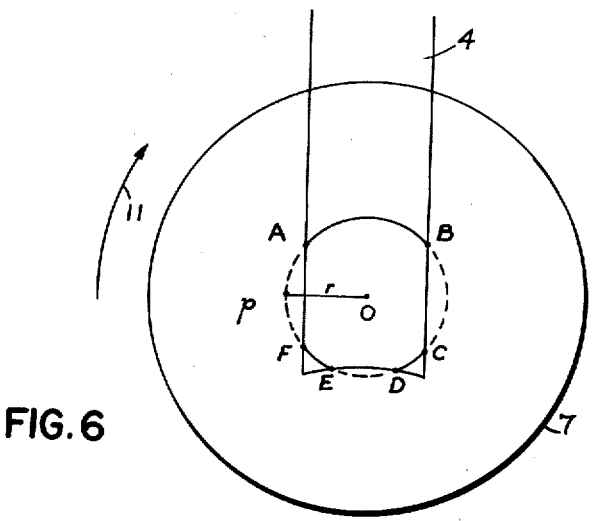
Fig. 6 is a diagram similar to that of Fig. 5 and illustrates the path of travel, through the beam, of a point in the product.

The dose received at any point in the product during one revolution will be proportional to the average ionizing effect over the total path in the beam multiplied by the time required for the point to travel over that path. Referring now to Fig. 6, the point $p$ travels along a circle of radius $r$, and the total path in the beam is the sum of arcs AB, CD, and EF. The time required for the point $p$ to travel over said total path is proportional to the sum $\theta$ of the angles AOB, COD, and EOF subtended by the arcs AB, CD, and EF respectively. It will be seen from Fig. 6 that $\theta$ varies only slightly (as a function of $r$) for points near the surface, and that $\theta$ varies not at all for points near the center of the product. If the beam diameter is very small, $\theta$ will be very small throughout the product except very close to the center, where it will rise very rapidly to 360°. On the other hand, if the beam diameter is nearly as great as the product diameter, $\theta$ will rise gradually from a value greater than 180° for points near the surface to 360° for points near the center. It is thus seen that the effect of rotation is to introduce a factor $\theta$ which tends to increase the dose towards the center, and that this effect becomes more pronounced and also more concentrated at the center as the beam diameter is reduced.

Figure 7:
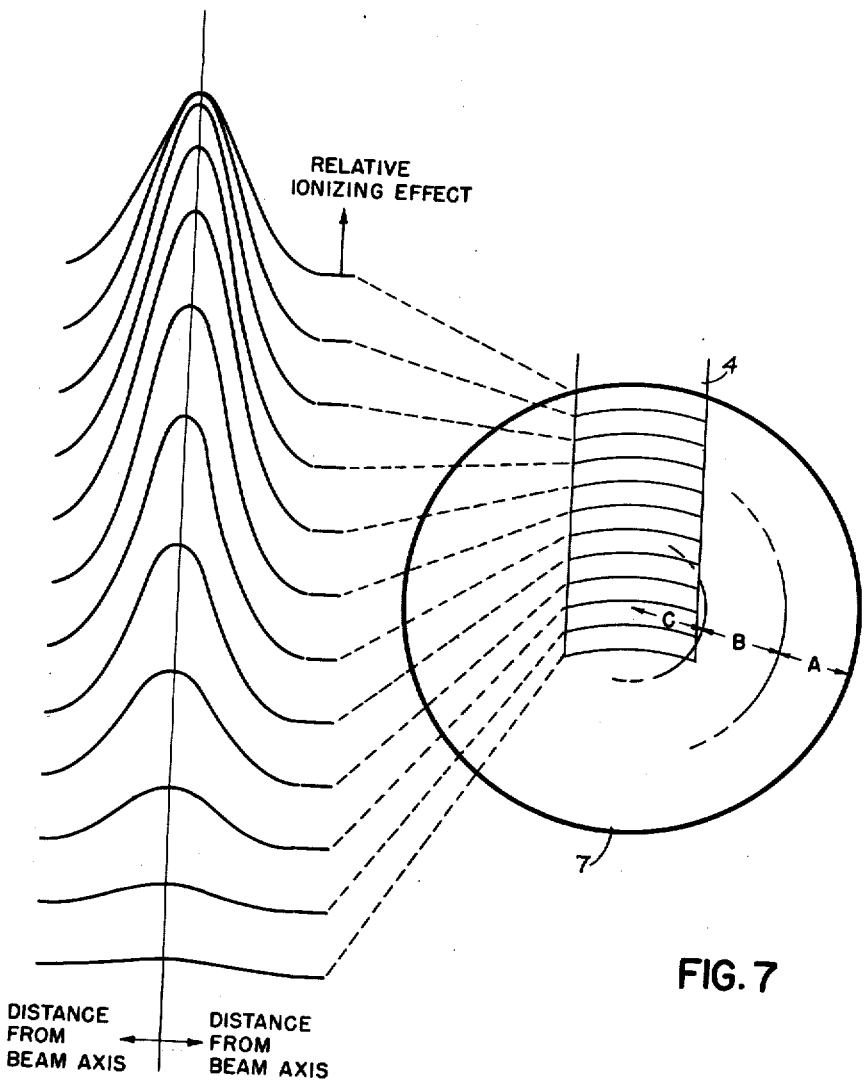
Fig. 7 is a graph illustrating the lateral variation of ionizing effect at various depths in a cross section of the product of Fig. 4, together with a diagram similar to that of Fig. 6 and to which said graph refers.
Figure 8:
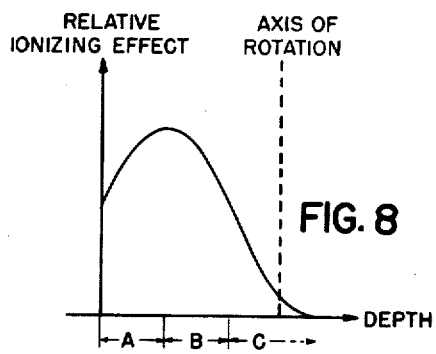
Fig. 8 is a graph illustrating the distribution of ionizing effect in depth for any fixed distance from the beam axis, and is derived from the graph of Fig. 7.
Figure 9:
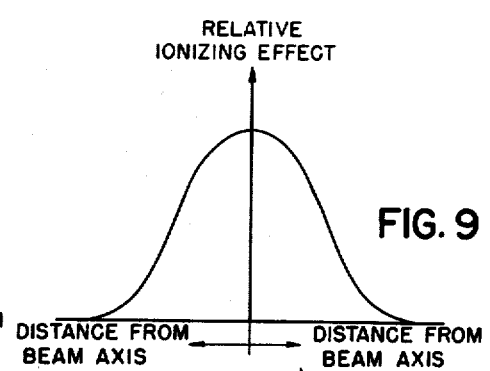
Fig. 9 is a graph illustrating the distribution of ionizing effect about the beam axis for any fixed depth, and is derived from the graph of Fig. 7.

The dose received at any given point in the product is proportional not only to $\theta$ (i. e., the time spent in the beam) but also to the average ionizing effect over the total path in the beam. Referring now to the graph of Fig. 7, therein is shown the lateral variation of ionizing effect at various depths from the surface of the product to the depth of maximum penetration. It will be seen that the distribution of ionizing effect shown by the graph of Fig. 7 is composed of two components, which are illustrated by the graphs of Figs. 8 and 9. For any fixed distance from the beam axis, the ionizing effect varies with depth in the manner shown by the graph of Fig. 8. For any fixed depth, the ionizing effect tends to have the Gaussian distribution about the beam axis shown by the graph of Fig. 9.

Figure 10:
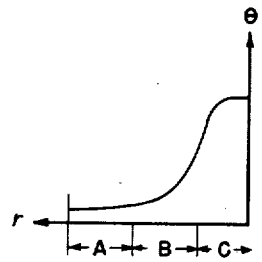
Fig. 10 is a graph illustrating the total length of time spent per revolution in the path of an electron beam of suitable diameter as a function of distance from the axis of rotation of the product of Fig. 4.
Figure 11:
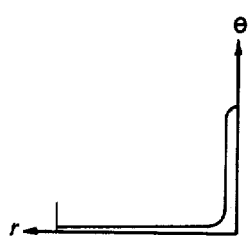
Fig. 11 is a graph, similar to that of Fig. 10, for a beam of very small diameter.
Figure 12:
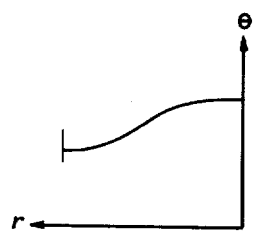
Fig. 12 is a graph, similar to that of Fig. 10, for a beam whose diameter equals that of the product.

Superimposed upon the variations in ionizing effect shown by the graphs of Figs. 8 and 9, is the effect of the angle $\theta$ on dose distribution. The graph of Fig. 10 illustrates the variation of $\theta$ with $r$ for a beam of suitable diameter, such as that shown in Fig. 6. For purposes of comparison, the graph of Fig. 11 illustrates the variation of $\theta$ with $r$ for a beam of very small diameter, and the graph of Fig. 12 illustrates the variation of $\theta$ with $r$ for a beam whose diameter equals that of the product.

Figure 13:
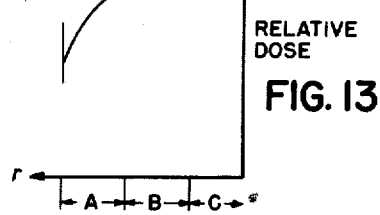
Fig. 13 is a graph illustrating the distribution of total dose in depth for a product which is rotated, in accordance with my invention, while being irradiated with a beam of high energy electrons of suitable diameter, and is derived from the graphs of Figs. 7 and 10.

Referring again to Figs. 6 and 7, it will be seen that points near the surface of the product (region A in Fig. 7) move through the beam at approximately constant depth. Since each such point travels all the way through the beam, the Gaussian distribution (Fig. 9) does not affect the total dose. Moreover, the rotational effect (region A in Fig. 10) is negligible, so that the dose distribution corresponds very nearly to that shown by region A in the graph of Fig. 8. That is, the dose first increases with increasing depth and then gradually levels off, as shown at region A in the graph of Fig. 13. Although there is some non-uniformity at the surface, this would not be objectionable, for example, in the case of the irradiation of a product enclosed in a container, since the container would need to be irradiated at its inner surface only. In fact, the decreased dose at the surface would be desirable, since energy absorbed by the outer layers of the container would in any case be wasted. In any event, the surface non-uniformity may always be eliminated by the use of filters or auxiliary generators, as disclosed in my co-pending application, Ser. No. 305,633, filed August 21, 1952.

Points in the region midway between the surface and the center of the product (region B in Fig. 7) will also travel all the way through the beam and at approximately constant depth, so that the effect of the distribution in depth of the ionizing effect (region B in Fig. 8) is pronounced while the effect of the Gaussian distribution (Fig. 9) is negligible. However, it is just in this particular region that the rotational effect (region B in Fig. 10) is most pronounced, so as to counteract the effect of the distribution in depth of the ionizing effect (region B in Fig. 8) and thus to maintain uniformity of dose, as shown at region B in the graph of Fig. 13.

Points near the center of the product (region C in Fig. 7) do not travel all the way through the beam, and their paths of travel tend to concentrate nearer the beam axis as the distance from the center of the product decreases. Consequently, although there is no longer a rotational effect (region C in Fig. 10) to counteract the effect of distribution in depth of the ionizing effect (region C in Fig. 8), the latter effect is counteracted by the effect of the Gaussian distribution (Fig. 9), so that uniformity of dose is maintained, as shown at region C in the graph of Fig. 13.

Figure 14:
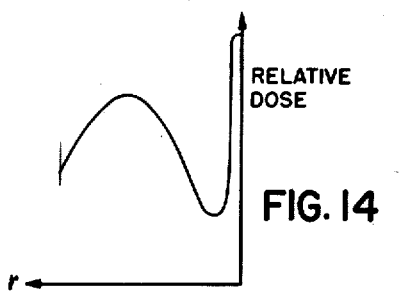
Fig. 14 is a graph, similar to that of Fig. 13, for a beam of very small diameter, and is derived from the graphs of Figs. 7 and 11.
Figure 15:
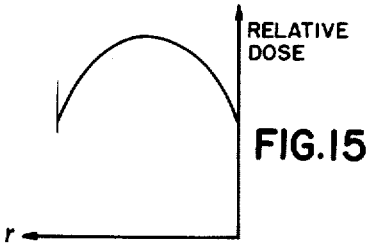
Fig. 15 is a graph, similar to that of Fig. 13, for a beam whose diameter equals that of the product, and is derived from the graphs of Figs. 7 and 12.

The use of an electron beam of very small diameter is to be avoided, since the effect of using such a beam is to overdose the center of the product without appreciably improving uniformity of dose elsewhere in the product, as is shown by the graph of Fig. 14. The diameter of the electron beam should, therefore, be not less than on the order of one-eighth of the diameter of the product; and, in general, maximum uniformity is obtained when the diameter of the electron beam is on the order of one-third of the diameter of the product. However, even where the beam diameter is as great as the diameter of the product, increased uniformity of dose is obtained, as shown by the graph of Fig. 15.

Having thus disclosed the method of my invention, together with a suitable embodiment of apparatus for practising the method, it is to be understood that although specific terms are employed, they are used in a generic and descriptive sense, and not for purposes of limitation; the scope of the invention being set forth in the following claims.

I claim:

1. That method of increasing the uniformity of dose produced by a beam of high energy electrons throughout the volume of an object irradiated thereby, which method comprises creating a beam of high energy electrons, having a diameter on the order of not less than one-eighth of the diameter of said object, directing said beam onto said object, and imparting a rotational velocity to said object about an axis transverse to the direction of travel of the electrons in said beam, and in the path of the beam said beam having a penetration only slightly in excess of that required to each said axis, said steps of creating said beam, directing said beam, and imparting said rotational velocity being carried out in such a manner as to render substantially uniform the dose distribution throughout the interior volume of said object.

2. That method of increasing the uniformity of dose produced by a beam of high energy electrons throughout the volume of an object irradiated thereby, which method comprises creating a beam of high energy electrons, having a diameter on the order of not less than one-eighth of the diameter of said object, directing said beam onto said object, and rotating said object about an axis substantially perpendicular to the direction of travel of the electrons in said beam, and in the path of the beam, said beam having a penetration only slightly in excess of that required to each said axis, said steps of creating said beam, directing said beam, and rotating said object being carried out in such a manner as to render substantially uniform the dose distribution throughout the interior volume of said object.

3. That method of increasing the uniformity of dose produced by a beam of high energy electrons throughout the volume of an object irradiated thereby, which method comprises creating a beam of high energy electrons, having a diameter on the order of not less than one-eighth of the diameter of said object, directing said beam onto said object, imparting a rotational velocity to said object about an axis transverse to the direction of travel of the electrons in said beam, and in the path of the beam, said beam having a penetration only slightly in excess of that required to reach said axis, and imparting a translational velocity to said object in a direction parallel to said axis, said steps of creating said beam, directing said beam, imparting said rotational velocity, and imparting said translational velocity being carried out in such a manner as to render substantially uniform the dose distribution throughout the interior volume of said object.

4. That method of increasing the uniformity of dose produced by a beam of high energy electrons throughout the volume of an object irradiated thereby, which method comprises creating a beam of high energy electrons, having a diameter on the order of not less than one-eighth of the diameter of said object, directing said beam onto said object, imparting a rotational velocity to said object about an axis transverse to the direction of travel of the electrons in said beam, and in the path of the beam, said beam having a penetration only slightly in excess of that required to reach said axis, imparting a translational velocity to said object in a direction parallel to said axis, and fanning said beam out in a plane parallel to said axis, said steps of creating said beam, directing said beam, imparting said rotational velocity, imparting said translational velocity, and fanning said beam, being carried out in such a manner as to render substantially uniform the dose distribution throughout the interior volume of said object.

5. That method of controlling the distribution of the ionizing energy of a beam of high energy electrons in a product irradiated by such beam, which method comprises creating a beam of high energy electrons, having a diameter not less than on the order of one-eighth of the diameter of said object, directing said beam onto said product, imparting a rotational velocity to said product about an axis transverse to the direction of travel of the electrons in said beam, and in the path of the beam, said beam having a penetration only slightly in excess of that required to reach said axis, and controlling the volume distribution of the ionizing energy of said beam in said product by controlling the energy of said electrons, the diameter of said beam, and the distance between said axis of rotation and the axis of said beam.

6. That method of controlling the distribution of the ionizing energy of a beam of high energy electrons in a product irradiated by such beam, which method comprises creating a beam of high energy electrons, having a diameter not less than on the order of one-eighth of the diameter of said object, directing said beam onto said product, imparting a rotational velocity to said product about an axis transverse to the direction of travel of the electrons in said beam, the energy of the electrons being sufficient so that, during irradiation of said product, some portion of said beam always intersects some portion of said axis, and controlling the volume distribution of the ionizing energy of said beam in said product by controlling the diameter of said beam.

7. That method of increasing the uniformity of dose produced by a beam of high energy electrons throughout the volume of a substantially cylindrical object irradiated thereby, which method comprises creating a beam of high energy electrons, directing said beam against the periphery of said object, rotating said object about its longitudinal axis, and in creating said beam of high energy electrons accelerating said electrons to an energy merely sufficiently high so that, during irradiation of said product, some portion of said beam always intersects some portion of said axis, the diameter of said beam being on the order of not less than one-eighth the diameter of said product, said steps of creating said beam, directing said beam, rotating said object, and accelerating said electrons being carried out in such a manner as to render substantially uniform the dose distribution throughout the interior volume of said object.

8. That method of increasing the uniformity of dose produced by a beam of high energy electrons throughout the volume of a substantially cylindrical object irradiated thereby, which method comprises creating a beam of high energy electrons, directing said beam against the periphery of said object, rotating said object about its longitudinal axis, and in creating said beam of high energy electrons accelerating said electrons to an energy merely sufficiently high so that, during irradiation of said product, some portion of said beam always intersects some portion of said axis, the diameter of said beam being on the order of one-third the diameter of said product, said steps of creating said beam, directing said beam, rotating said object, and accelerating said electrons being carried out in such a manner as to render substantially uniform the dose distribution throughout the interior volume of said object.

References Cited in the file of this patent

UNITED STATES PATENTS

| | | |
|---|---|---|
| 2,095,502 | Johnston | Oct. 12, 1937 |
| 2,575,426 | Parnell | Nov. 20, 1951 |
| 2,602,751 | Robinson | July 8, 1952 |

OTHER REFERENCES

"Evaluation of Food Irradiation Procedures," Goldblith et al., Industrial and Engineering Chemistry, February 1952, pp. 310–314.